United States Patent
Ranganathan et al.

(10) Patent No.: US 7,529,949 B1
(45) Date of Patent: May 5, 2009

(54) HETEROGENEOUS POWER SUPPLY MANAGEMENT SYSTEM

(75) Inventors: Parthasarathy Ranganathan, Fremont, CA (US); Khaldoun Alzien, Houston, TX (US); Phil Leech, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 11/258,758

(22) Filed: Oct. 26, 2005

(51) Int. Cl.
*G06F 1/26* (2006.01)

(52) U.S. Cl. ..................................... 713/300
(58) Field of Classification Search ................. 713/300
See application file for complete search history.

(56) References Cited

U.S. PATENT DOCUMENTS

| | | | | |
|---|---|---|---|---|
| 6,153,946 | A * | 11/2000 | Koch et al. | 307/64 |
| 6,542,997 | B1 * | 4/2003 | Rolls et al. | 713/324 |
| 6,618,811 | B1 * | 9/2003 | Berthaud et al. | 713/300 |
| 6,625,736 | B1 * | 9/2003 | Berthaud et al. | 713/300 |
| 6,747,369 | B2 | 6/2004 | Griffith et al. | |
| 6,804,616 | B2 * | 10/2004 | Bodas | 702/61 |
| 7,131,012 | B2 * | 10/2006 | Egan et al. | 713/300 |
| 7,152,175 | B2 * | 12/2006 | Madany et al. | 713/340 |
| 7,325,050 | B2 * | 1/2008 | O'Connor et al. | 709/223 |
| 2004/0158771 | A1 | 8/2004 | Garnett et al. | |
| 2005/0116546 | A1 * | 6/2005 | Zeighami et al. | 307/51 |
| 2005/0172157 | A1 | 8/2005 | Artman et al. | |
| 2006/0161794 | A1 * | 7/2006 | Chiasson et al. | 713/300 |

FOREIGN PATENT DOCUMENTS

JP 05-137256 * 6/1993

OTHER PUBLICATIONS

Felter, W. et al., "A Performance-Conserving Approach for Reducing Peak Power Consumption in Server Systems", ICS'05, Jun. 2005, Boston, MA.
Chase, J.S. et al., "Managing Energy and Server Resources in Hosting Centers", downloaded Oct. 18, 2005.
Helmbold, D.P. et al., "A Dynamic Disk Spin-Down Technique for Mobile Computing", downloade Oct. 18, 2005.
Lebeck, A.R. et al., "Power Aware Page Allocation", (ASPLOS-IX), Nov. 2000.
Pinheiro, E. et al., "Load Balancing and Unbalancing for Power and Performance in Cluster-Based Systems", downloaded Oct. 18, 2005.
Advanced Configuration & Power Interface, http://www.acpi.info/, downloaded Oct. 18, 2005.

* cited by examiner

*Primary Examiner*—Chun Cao

(57) ABSTRACT

A system for managing heterogeneous supply of power includes a plurality of heterogeneous power supplies having a primary power supply and a secondary power supply. The primary power supply has a first power rating and the secondary power supply has a second power rating, where the first power rating differs from the second power rating. In addition, power is supplied to the electronic system through at least one of the primary power supply and the secondary power supply.

17 Claims, 5 Drawing Sheets

HETEROGENEOUS POWER SUPPLY MANAGEMENT SYSTEM

BACKGROUND

High availability is increasingly one of the top expressed needs in enterprise environments. It is estimated that even a few seconds of downtime for a relatively large enterprise environment often leads to dramatic losses in revenue. Interruptions in the power delivery to a computing system are some of the causes of system failures. These interruptions are typically the result of power failures, noisiness in the power supply, or human or environmental error.

To avoid the problems associated with power delivery interruptions, computing systems typically include support for redundant power supplies. The redundant power supplies are often connected to multiple power sources and include circuitry for substantially ensuring that power is continuously delivered to the computing systems in the event that one or more of the power supplies fails. The use of redundant power supplies, however, is relatively expensive and inefficient. In addition, redundant power supplies often require relatively large amounts of space as well as additional cooling devices.

Thus, there is a continuing need to provide a power system having redundant power supplies that do not suffer from the drawbacks associated with conventional power systems.

SUMMARY OF THE INVENTION

A system for managing heterogeneous supply of power is disclosed herein. The system includes a plurality of heterogeneous power supplies having a primary power supply and a secondary power supply. The primary power supply has a first power rating and the secondary power supply has a second power rating, where the first power rating differs from the second power rating. In addition, power is supplied to the electronic system through at least one of the primary power supply and the secondary power supply.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

A power management system having heterogeneous power supplies is disclosed herein. As used throughout the present disclosure, the terms "heterogeneous power supplies" are intended to denote two or more power supplies having at least two different power ratings with respect to each other. In other words, at least one of the power supplies may have a power rating that is lower than another of the power supplies. In one respect, in the event of an interruption in the supply of power from one of the power supplies, at least one of the remaining power supplies may supply power to an electronic system. Additionally, because the power supplied with the remaining at least one power supply differs from the original power supply, the maximum power consumption of the electronic system may also be varied. A power control agent is also disclosed herein that is configured to vary the power budget of the electronic system such that its power consumption level is remained within a maximum power rating of the at least one remaining power supply.

As further discussed herein below, the power control agent may also be configured to substantially optimize the delivery of power to the electronic system between power supplies having different power ratings to substantially minimize costs associated with powering the electronic system. In one example, the power control agent may supply power from the heterogeneous power supplies according to the power consumption level of the electronic system. In this example, the power control agent may supply power from a power supply having a higher rating in response to the power consumption level of the electronic system exceeding a predetermined level. In another example, the power control agent may supply power from one or more of the power supplies having different power ratings depending upon, for instance, the efficiency ratings of the heterogeneous power supplies to thereby substantially optimize the energy usage levels of the heterogeneous power supplies.

Figure 1:
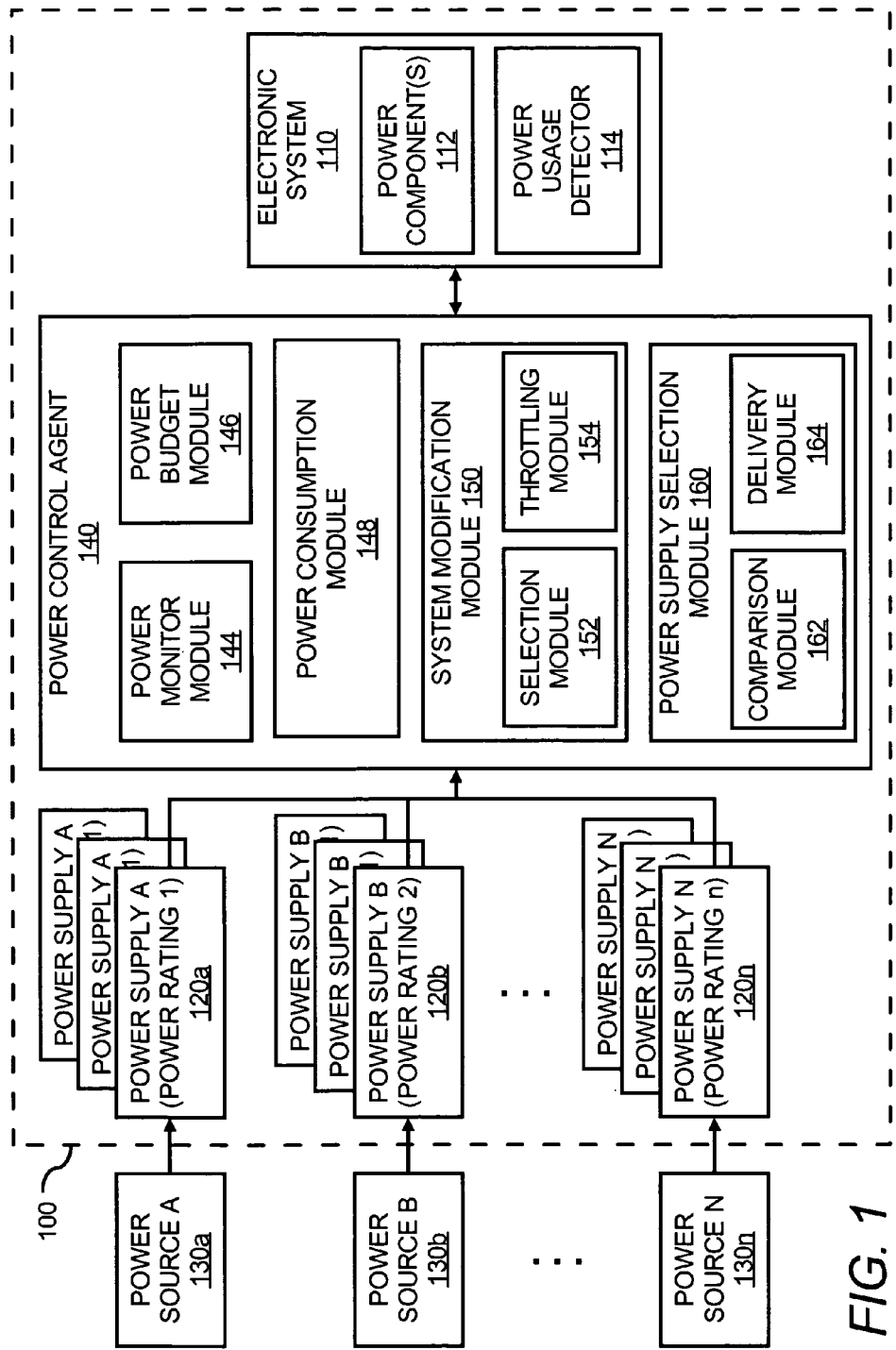
FIG. 1 shows a block diagram of a power management system, according to an embodiment of the invention.

With reference first to FIG. 1, there is shown a block diagram of a power management system 100 according to an example of the invention. It should be understood that the following description of the power management system 100 is but one manner of a variety of different manners in which such a power management system 100 may be configured and operated. In addition, it should be understood that the power management system 100 may include additional components and that some of the components described may be removed and/or modified without departing from a scope of the power management system 100.

Generally speaking, the power management system 100 may be employed to control power delivery in any number of electronic systems 110. More particularly, the power management system 100 may be employed to reduce the costs associated with providing redundant power delivery to one or more electronic systems 110. The electronic systems 110 may range from, for instance, an individual server to some or all of the servers or other components in a data center. The servers or other components may comprise, for instance, rack mounted servers, blade PCs, nodes in computer network, network switches, storage systems, etc. Thus, although a single electronic system 100 is depicted in FIG. 1, it should be understood that the various techniques and examples disclosed herein may be implemented to manage power among a plurality of electronic systems 110 without departing from a scope of the power management system 100. For purposes of simplicity, however, reference will be made to a single electronic system 110.

The electronic system 110 is depicted as including one or more power components 112 and an optional power usage detector 114. The power component(s) 112 may comprise, for instance, a processor, a memory, etc., in the electronic system 110. The power usage detector 114 may be employed to detect the amount of power being consumed by the electronic system 110. The power usage detector 114 may comprise, for instance, relatively simple current sense resistors connected to an analog-to-digital converter. In addition, or alternatively, the power usage detector 114 may comprise software configured to calculate the amount of power consumed by the electronic system 110.

As also shown in FIG. 1, the power management system 100 includes a plurality of power supplies 120a-120n, where "n" is an integer greater than one. The power supplies 120a-120n are depicted as receiving power from a plurality of power sources 130a-130n, such as alternating current (AC) sources. Although each of the power supplies 120a-120n is depicted as receiving power from respective power sources 130a-130n, it should be understood that some or all of the power supplies 120a-120n may receive power from one or more of the power sources 130a-130n.

In addition, the power supplies 120a-120n may each include a transformer, a rectifier, a filter, and a regulator, which have not been shown for purposes of simplicity. In operation, the transformer steps the AC voltage received from the power sources 130a-130n either up or down and the rectifier converts the transformed voltage into a pulsating unipolar (DC) voltage. The filter smoothes out the voltage into a continuous voltage and the regulator regulates the voltage such that the supplied voltage is maintained within a predetermined range.

The power supplies 120a-120n are configured to include a number of different power ratings. That is, for instance, the power rating for a primary power supply 120a may differ from a power rating for a second power supply 120b. In addition, the power rating for a third power supply 120c may differ from the power ratings of the primary power supply 120a and the second power supply 120b. Moreover, and as shown in FIG. 1, one or more of the power supplies 120a-120n may have the same power rating.

One or more of the power supplies 1200a, which may be considered as primary power supplies for purposes of this description, may be rated to handle the worst possible power draw for the electronic system 110. That is, one or more of the power supplies 120a may be rated to handle peak load demands of the electronic system 110. In addition, one or more of the remaining power supplies 120b-120n, which may also be considered as secondary power supplies for purposes of this description, may be rated to handle relatively lower power demands of the electronic system 110. As such, for instance, at least two of the power supplies 120a-120n may have different power ratings, or are otherwise heterogeneous, with respect to each other.

In another example, both the primary and secondary power supplies 120a-120n may have power ratings that fall below the maximum power draw or a present level below the maximum power draw of the electronic system 110. In this example, both a primary and a secondary power supply 120a-120n may be employed to supply power to the electronic system 110 as warranted. The determination of which or both of the primary and secondary power supplies 120a-120n are to be used to supply power may be based upon the efficiencies of the primary and secondary power supplies 120a-120n, which may be based upon the loads on the electronic system 110. A discussion of various manners in which the primary and secondary power supplies 120a-120n may be operated to substantially optimized efficiency in supplying power to the electronic system is described herein below.

According to an example, the selection of power ratings for the power supplies 120a-120n may be governed by the expected probability of failure and the expected workload operational range of the electronic system 110. In addition, the selection may be based upon the potential tolerance for performance degradation during periods when the one or more power supplies 120a-120n are nonfunctioning. Additional characteristics of the power supplies 120a-120n and their efficiency curves may also be factored during a selection process.

The amounts of power consumed by the power supplies 120a-120n are generally based on the efficiency ratings of the power supplies 120a-120n. The efficiency ratings of the power supplies 120a-120n may be a measure of the amount of power lost by the power supplies 120a-120n in supplying power to the electronic system 110. The efficiency ratings of the power supplies 120a-120n may be included in efficiency curves that relate the efficiencies of the power supplies 120a-120n and the loading on the electronic system 110. By way of example, the efficiency curve for a power supply 120a may show that the power supply 120a has an efficiency rating of 95% when the electronic system 110 has a load that is 90% of its rated maximum and an efficiency rating of 30% when the load is 30% of the rated maximum. As such, the power supply 120a may be more efficient when the power supply 120a is supplying greater amounts of power to the electronic system 110. This may occur, for instance, because the amount of power lost in operating the power supply 120a may have less of a difference at the different loading levels than the differences in the different loading levels themselves.

As described in greater detail herein below, by utilizing heterogeneous power supplies 120a-120n in the power management system 100, the amount of loss in the power supply may be relatively reduced as compared with systems employing conventional redundant power supplies. In other words, the amount of power lost during the supply of power to the electronic system 110 may substantially be optimized through implementation of the heterogeneous power supplies 120a-120n described herein.

In addition, utilization of the heterogeneous power supplies 120a-120n, as disclosed herein, generally reduces the costs associated with manufacturing the power management system 100. The costs may be reduced because the one or more power supplies 120a-120n having the relatively lower power ratings may be relatively less expensive to manufacture and obtain. Moreover, because power supplies having lower power ratings generally require less space as compared with power supplies having higher power ratings, the amount of space required by a redundant power supply is reduced as compared with systems that employ conventional redundance power supplies.

With reference again to FIG. 1, the power management system 100 is further depicted as including a power control agent 140 generally positioned to detect the supply of power from the one or more power supplies 120a-120n to the electronic system 110. The power control agent 140 is depicted as including a power monitor module 144, a power budget module 146, a power consumption module 148, a system modification module 150, and a power supply selection module 160. The system modification module 150 is also depicted as having a selection module 152 and a throttling module 154 and the power supply selection module 160 is depicted as having a comparison module 162 and a delivery module 164. Some or all of the modules 144-164 may comprise software stored either locally or in an external memory which the power control agent 140 may implement. In addition, or alternatively, some or all of the modules 144-164 may comprise one or more hardware devices that may be implemented by the power control agent 140. As such, for example, the power control agent 140 may be stored at a single location or the power control agent 140 may be stored in a distributed manner across multiple locations, where the locations comprise at least one of hardware and software.

In one example, the power control agent 140 is configured to perform various functions based upon the rating of power delivered to the electronic system 110. In other words, the power control agent 140 is configured to vary operations of the electronic system 110 depending upon which of the heterogeneous power supplies 120a-120n is supplying power to the electronic system 110. In another example, the power control agent 140 is configured to vary the supply of power from one or more heterogeneous power supplies 120a-120n to the electronic system 110 based upon a detected load on the electronic system 110.

In the first example, the power control agent 140 may implement the power monitor module 144 to determine the rating of the power supplied by one or more of the power supplies 120a-120n. Under normal operating conditions, the power supplied to the electronic system 110 may be supplied by one or more of the primary power supplies 120a-120n. In other words, power may be delivered to the electronic system 110 from one or more power supplies 120a-120n that are rated for maximum or peak load conditions.

If, however, there is a disruption to the power supplied by one or more of the primary power supplies 120a-120n, the supply of power to the electronic system 110 may automatically, and substantially instantaneously, be diverted such that power is supplied by one or more of the secondary power supplies 120a-120n. In this instance, the power control agent 140 may implement the power monitor module 144 to detect the switch in power supplies 120a-120n. In addition, the switch in power supplies 120a-120n causes the rating of the power supplied to the electronic system 110 to be reduced because the one or more secondary power supplies 120a-120n are at a relatively lower power rating. The power control agent 140 may also implement the power monitor module 144 to identify the maximum power rating of the one or more secondary power supplies 120a-120n.

The supply of power to the electronic system 110 may therefore be decreased. The power control agent 140 may also implement the power budget module 146 to determine a new power budget that corresponds to the decreased power rating. In one respect, the power control agent 140 may modify the power budget such that the power budget of the electronic system 110 remains within the relatively lower power ratings of the one or more secondary power supplies 120a-120n. In addition, the power control agent 140 may set the power budget to a value below the power rating of the one or more secondary power supplies 120a-120n to substantially accommodate for unanticipated spikes in the power usage by the electronic system 110.

In addition, the power control agent 140 may implement the system modification module 150 to modify at least one operation of the electronic system 110 to substantially ensure that the power consumption level remains within the new power budget. More particularly, for instance, the power control agent 140 may implement the selection module 152 to select at least one power component 112 to throttle and/or adjust. In addition, the power control agent 140 may implement the throttling module 154 to select the level to which the selected at least one power component 112 is to be throttled and/or adjusted. Moreover, the power control agent 140 may transmit instructions to the electronic system 110 or control the at least one power component 112 to operate at the selected level.

In the second example, the power control agent 140 may be configured to select one or more of the heterogeneous power supplies 120a-120n to supply power to the electronic system 110 in manners that substantially minimize costs associated with powering the electronic system 110. In this example, the power control agent 140 may receive information pertaining to the amount of power required by the electronic system 110, for instance, through implementation of the power usage detector 114. Based upon the actual or anticipated load on the electronic system 110, the power control agent 140 may implement the power supply selection module 160 to vary the deliver of power from one or more of the heterogeneous power supplies 120a-120n.

More particularly, for instance, the power control agent 140 may implement the comparison module 162 to compare the current or predicted power consumption level of the electronic system 110 with a predetermined power consumption level. In addition, the power control agent 140 may implement the delivery module 164 to vary delivery of power from the one or more power supplies 120a-120n depending upon an output of the comparison module 162.

Figure 2:
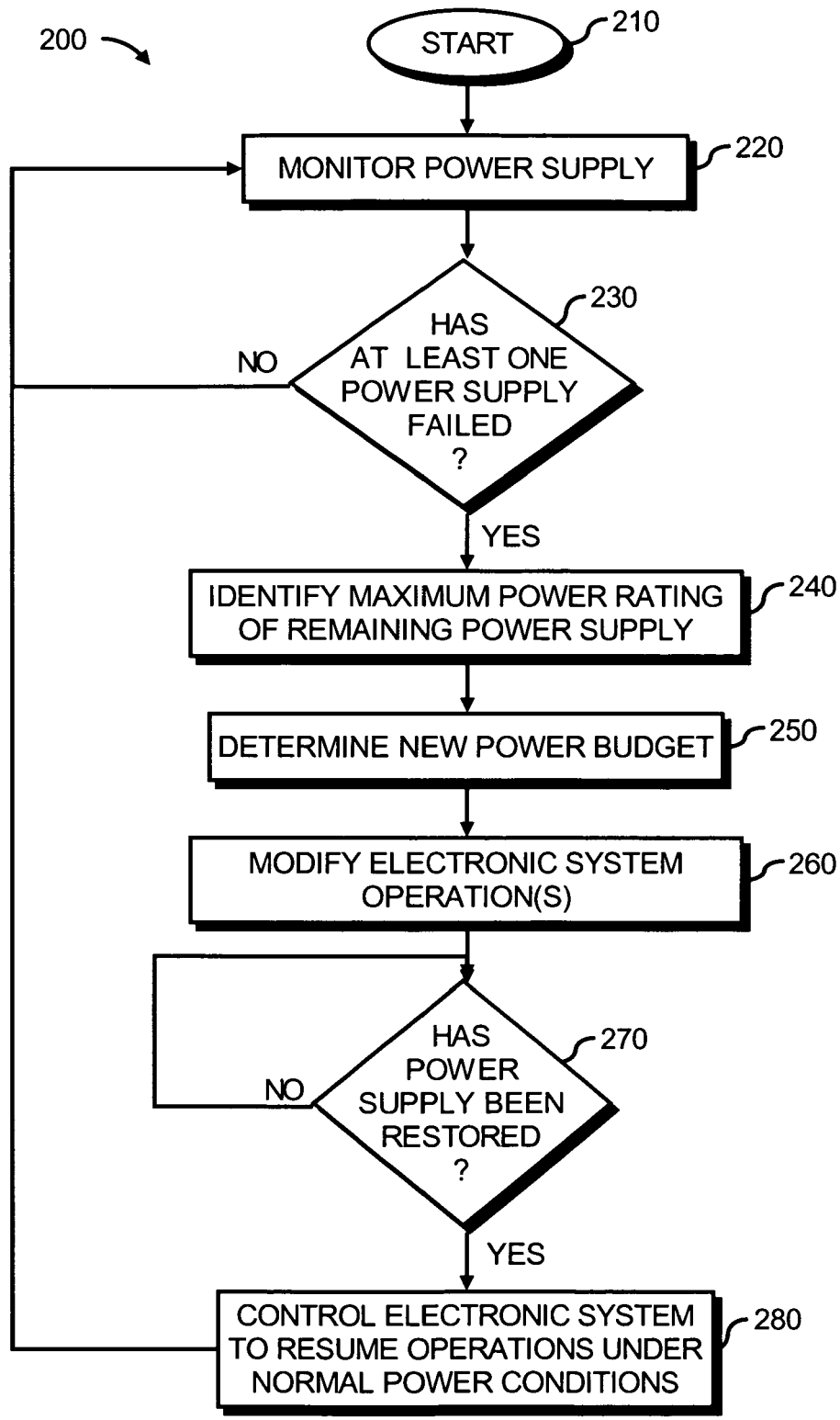
FIG. 2 shows a flow diagram of a method for managing power delivered to an electronic system in a power management system having heterogeneous power supplies, according an embodiment of the invention.

Turning now to FIG. 2, there is shown a flow diagram of a method 200 for managing power delivered to an electronic system 110 in a power management system 100 having heterogeneous power supplies 120a-120n, according to an example. It is to be understood that the following description of the method 200 is but one manner of a variety of different manners in which an example of the invention may be practiced. It should also be apparent to those of ordinary skill in the art that the method 200 represents a generalized illustration and that other steps may be added or existing steps may be removed, modified or rearranged without departing from a scope of the method 200.

The description of the method 200 is made with reference to the power management system 100 illustrated in FIG. 1, and thus makes reference to the elements cited therein. It should, however, be understood that the method 200 is not limited to the elements set forth in the power management system 100. Instead, it should be understood that the method 200 may be practiced by a system having a different configuration than that set forth in the power management system 100.

The method 200 may be initiated at step 210 in response to any of a number of stimuli or conditions. For instance, the method 200 may be initiated with activation of the components, such as, the power components 112, in the electronic system 110. In addition, or alternatively, the method 200 may be manually initiated or the power control agent 140 may be programmed to initiate the method 200 at various times, for a set duration of time, substantially continuously, etc.

At step 220, the power control agent 140 may implement the power monitor module 144 to monitor the power being supplied to the electronic system 110 from one or more of the power supplies 120a-120n. In addition, the power control agent 140 may determine the power rating of the one or more power supplies 120a-120n that are supplying power to the electronic system 110. As the power supply is monitored at step 220, the power control agent 140 may determine whether at least one of the power supplies 120a-120n has failed at step 230. If none of the power supplies has been determined as having failed, the power being supplied by one or more of the power supplies 120a-120n may continue to be monitored as indicated at step 220.

If, however, the power control agent 140 determines that at least one of the power supplies 120a-120n has failed at step 230, the power control agent 140 may also implement the power monitor module 144 to identify the maximum power rating of one or more of the remaining one or more power supplies 120a-120n that have not failed, a step 240. As discussed above, in the event of a power supply failure, power delivery to the electronic system 110 may be switched automatically, and substantially instantaneously, from the failed one or more power supplies 120a-120n to one or more of the secondary power supplies 120a-120n. In addition, the one or more secondary power supplies 120a-120n are at a relatively lower power rating as compared with the one or more primary power supplies 120a-120n.

At step 250, the power control agent 140 may implement the power budget module 146 to determine a new power budget corresponding to the maximum identified power rating of the one or more remaining power supplies 120a-120n. The new power budget may be selected, for instance, to maintain operations of the electronic system 110 substantially within the maximum identified power rating. In addition, the new power budget may be set to a value below the maximum identified power rating of the one or more secondary power supplies 120a-120n to substantially accommodate for unanticipated spikes in the power usage by the electronic system 110.

At step 260, the power control agent 140 may implement the system modification module 150 to modify at least one operation of the electronic system 110 to substantially ensure that the power consumption level of the electronic system 110 remains within the new power budget. More detailed discussions of various manners in which the power consumption level of the electronic system 110 may be maintained within the modified power budget are provided herein below.

At step 270, the power control agent 140 may implement the power monitor module 144 to determine whether power from the one or more primary power supplies 120a-120n has been restored. If power has not been restored, the power control agent 140 may continue to implement the power monitor module 144 to monitor the power supplied to the electronic component 110 until the power control agent 140 determines that power has been restored from the one or more primary power supplies 120a-120n. If it is determined that power has been restored, the supply of power to the electronic system 110 may automatically be switched back from the one or more primary power supplies 120a-120n. In addition, the power control agent 140 may control the electronic system 110 to resume operations under normal power conditions, as indicated at step 280. In other words, at step 280, the power control agent 140 may remove the restrictions imposed at step 260 on the electronic system 110.

The method 200 may be repeated in a substantially continuous manner such that the electronic system 110 may be supplied with power through the one or more secondary power supplies 120a-120n in the event of an interruption in the power supplied by the one or more primary supplies 120a-120n.

Figure 3:
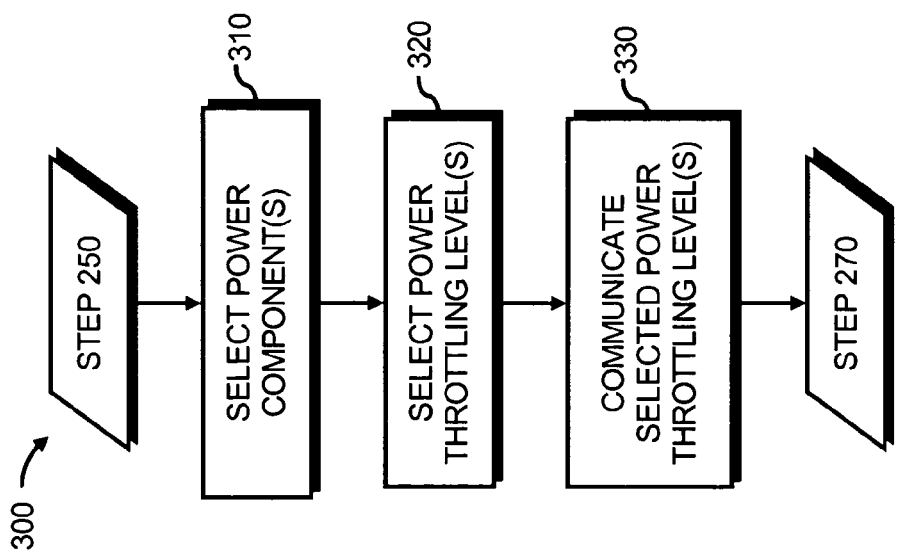
FIG. 3 shows a flow diagram of a method for modifying at least one operation of the electronic system depicted in FIG. 2, according to an embodiment of the invention.

With reference now to FIG. 3, there is shown a flow diagram of a method 300 for modifying at least one operation of the electronic system 110 corresponding to a new power budget, according to a first example. In other words, the method 300 is a more detailed depiction of an example of step 260 shown in FIG. 2. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

As shown in FIG. 3, following step 250 (FIG. 2), the power control agent 140 may implement the selection module 152 of the system modification module 150 to select at least one power component 112 to throttle and/or adjust, as indicated at step 310. The selection module 152 may employ any of a relatively wide range of heuristics in determining which of the at least one power components 112 to throttle and/or adjust. The heuristics may be based upon policies that range from relatively simple policies to relatively more elaborate policies. An example of a suitable, relatively simple policy includes selecting the at least one power component 112 based upon a "round-robin" allocation scheme. An example of a suitable, relatively more elaborate policy includes selecting the at least one power component 112 based upon the relative priority of tasks running on the individual power components 112 and implementing relatively sophisticated models to predict resource usage among the power components 112. The determination of which policy to implement in determining which of the power components 112 is to be throttled and/or adjusted may depend upon, for instance, the processing power of the power control agent 140, the amount of time allocated to making this determination, etc.

Although particular reference has been made above to a power component 112 of an electronic system 110, it should be understood that one or more power components 112 of a plurality of electronic systems 110 may also be selected at step 310 without departing from a scope of the method 300. In this regard, step 310 may include the selection of one or more electronic systems 110 in addition to or in place of the selection of one or more power components 112.

At step 320, the power control agent 140 may implement the throttling module 154 of the system modification module 150 to select the levels to which the selected at least one power component 112 (and/or the selected electronic systems 110) are to be throttled and/or adjusted. The throttling levels may be selected such that the power consumed by the electronic system 110 remains within the new power budget.

The power control agent 140 may transmit instructions or otherwise communicate the selected power throttling levels to the electronic system 110, as indicated at step 330. In addition, or alternatively, the power control agent 140 may directly control the selected power component(s) 112 to thereby throttle and/or adjust the selected power component(s) 112. In any regard, the manner in which the power component(s) 112 is throttled and/or adjusted may be based upon the power component 112 itself. More particularly, for instance, if the power component(s) 112 comprises a processor, the power component 112 may be configured to use different power states as embodied, for instance, in the ACPI specification, which may be implemented by the electronic system 110. In this example, the power state(s) of the power component(s) 112 may be increased by one or more states to thereby decrease the power utilization(s) of the power component(s) 112. As another example, the voltage and frequency of the power component(s) 112 may be throttled or scaled to vary the power consumption level of the electronic system 110.

As a further example, if the power component(s) 112 comprises a storage element, the power state or the disk spin rate of the storage element may be varied. As a yet further example, one or more power components 112 contained in the electronic system 110 may be activated or deactivated or heterogeneity in these components 112 may be used to vary the power consumption level of the electronic system 110. In addition, the power control agent 140 may control at least one of the throttling and adjusting of the power component(s) 112, such that their power consumption levels are varied in at least one of an incremental and a non-incremental manner.

Following throttling or adjusting of the selected at least one power component 112 at step 330, it may be determined as to whether power supplied from the one or more primary power supplies 120a-120n has been restored at step 270 (FIG. 2) and the steps outlined in FIG. 2 may be repeated.

Figure 4A:
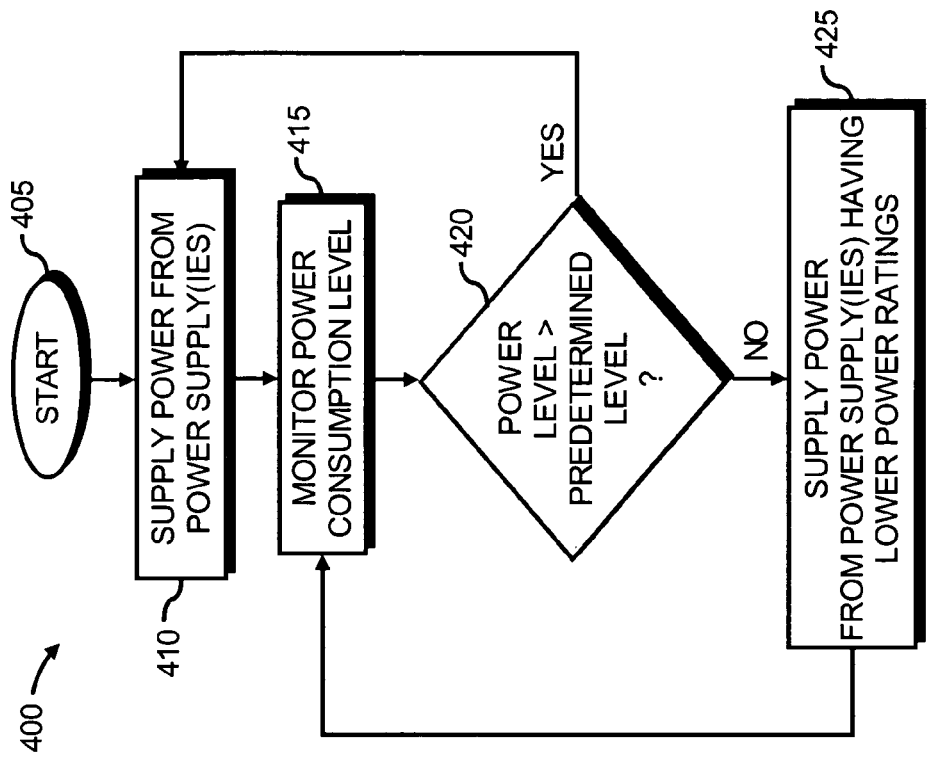
FIG. 4A shows a flow diagram of a method for varying power supplied to an electronic system in a power management system having heterogeneous power supplies, according to an embodiment of the invention.

Turning now to FIG. 4A, there is shown a flow diagram of a method 400 for varying power supplied to an electronic system 110 in a power management system 100 having heterogeneous power supplies 120a-120n, according to an example. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

Generally speaking, the method 400 may be performed to substantially minimize costs associated with supplying power to the electronic system 110. The costs may substantially be minimized because the heterogeneous power supplies 120a-120n have non-linear efficiency curves based on the load on the electronic system 110. That is, for instance, it may be relatively less efficient to supply power to the electronic system 110 from a power supply 120a rated for 100% of the load capacity of the electronic system 110 when the electronic system 110 is operating at 50% as compared with supplying power from a power supply 120a rated for 50% of the load capacity, as discussed above.

The description of the method 400 is made with reference to the power management system 100 illustrated in FIG. 1, and thus makes reference to the elements cited therein. It should, however, be understood that the method 400 is not limited to the elements set forth in the power management system 100. Instead, it should be understood that the method 400 may be practiced by a system having a different configuration than that set forth in the power management system 100.

The method 400 may be initiated at step 405 in response to any of a number of stimuli or conditions. For instance, the method 400 may be initiated with activation of the components in the electronic system 110. In addition, or alternatively, the method 400 may be manually initiated or the power control agent 140 may be programmed to initiate the method 400 at various times, for a set duration of time, substantially continuously, etc.

At step 405, power may be supplied to the electronic system 110 from the one or more power supplies 120a-120n. In addition, the power control agent 140 may monitor the power consumption level of the electronic system 110, at step 415.

More particularly, for instance, the power control agent 140 may receive information pertaining to the current or predicted power consumption level of the electronic system 110 from the power usage detector 114. The power control agent 140 may also implement the comparison module 162 of the power supply selection module 160 to compare the monitored current or predicted power consumption level with a predetermined power consumption level, as indicated at step 420.

The predetermined power consumption level may comprise, for instance, the maximum power rating for one or more of the power supplies 120a-120n. Alternatively, the predetermined power consumption level may comprise a value below the maximum power rating for the one or more power supplies 120a-120n. As a yet further alternative, the predetermined power consumption level may comprise a user-selected value that may be based upon any number of various factors.

If it is determined that the current or predicted power consumption level exceeds the predetermine power consumption level at step 420, the power control agent 140 may continue to enable the supply of power from the one or more power supplies 120a-120b, as indicated at step 410. In addition, the power control agent 140 may continue to monitor the power consumption level at step 415.

If, however, it is determined that the power consumption level falls below the predetermined power consumption level at step 420, the power control agent 140 may implement the delivery module 164 of the power supply selection module 160 to supply power from the one or more power supplies 120a-120n having relatively lower power ratings at step 425. As such, the amount of power used in supplying power to the electronic system 110 may substantially be optimized through implementation of the method 400.

Following step 425, the power control agent 140 may continue to monitor the power consumption level of the electronic system 110, as indicated at step 415. In addition, steps 410-425 may be repeated in a substantially continuous manner to thus substantially minimize the costs associated with powering the electronic system 110. In this regard, for instance, if the power control agent 140 determines at step 420 that the power consumption level of the electronic system 110 has or will increase beyond the predetermined power consumption level, which equates to a "yes" condition, the power control agent 140 may implement the delivery module 164 to vary the supply of power from the one or more power supplies 120a-120n having the relatively lower power ratings to the one or more power supplies 120a-120n having relatively higher power ratings at step 410. Consequently, for instance, the method 400 generally enables an increase in power supplied to the electronic system 110 as needed.

Although particular reference has been made to the use of one or more power supplies 120a-120n having higher power ratings at step 410 and the use of one or more power supplies 120a-120n having lower power ratings at step 425, the method 400 may also be performed in situations where the power ratings are reversed between steps 410 and 425. In this instance, the one or more power supplies 120a-120n having the lower power ratings may comprise the default power supplies and a switch to the one or more power supplies 120a-120n at step 425 may be made in response to a current or predicted power consumption level of the electronic system 110 exceeding the maximum power rating of the one or more primary power supplies.

Figure 4B:
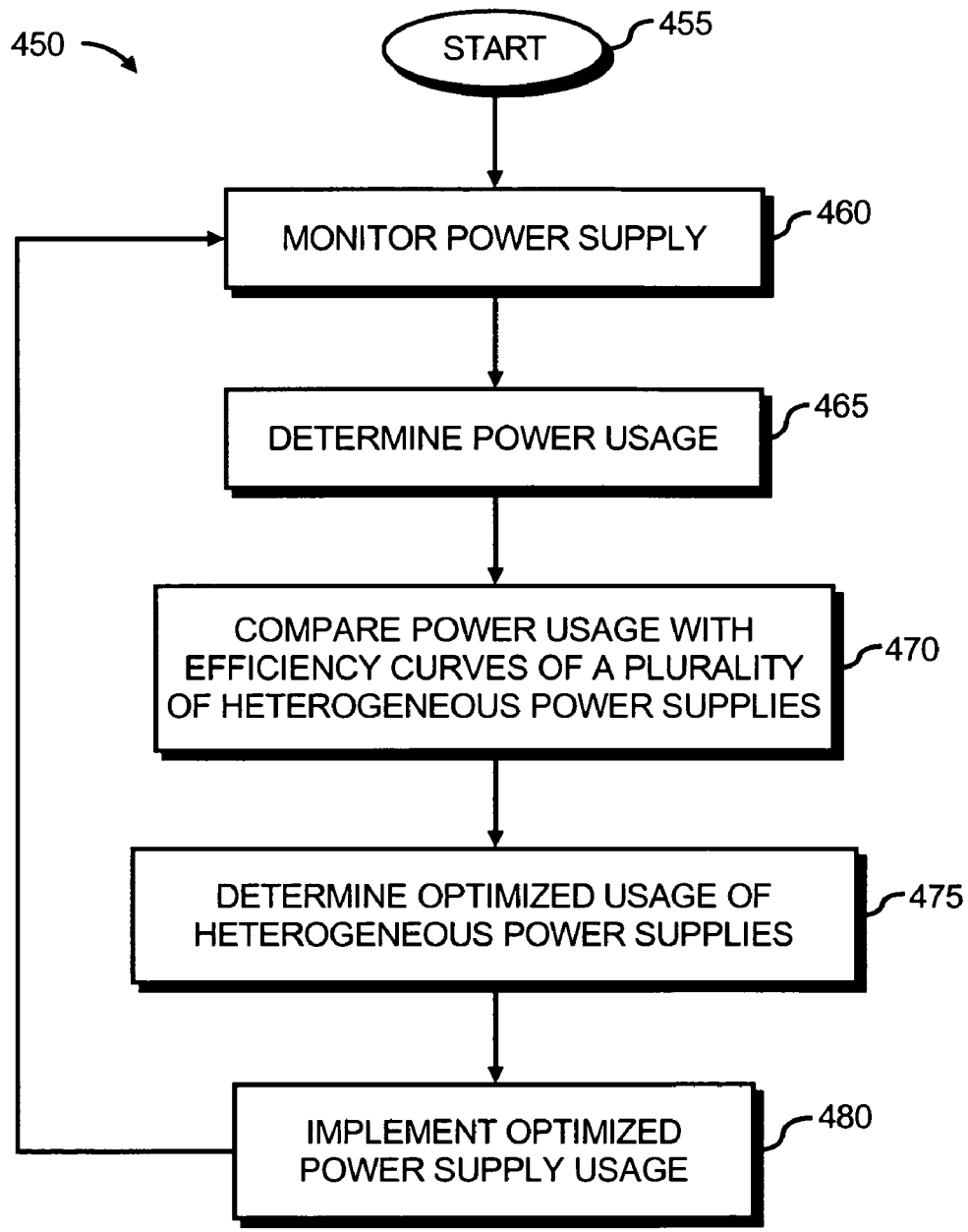
FIG. 4B shows a flow diagram of a method for varying power supplied to an electronic system in a power management system having heterogeneous power supplies, according to another embodiment of the invention.

With reference now to FIG. 4B, there is shown a flow diagram of a method 450 for varying power supplied to an electronic system 110 in a power management system 100 having heterogeneous power supplies 120a-120n, according to another example. It is to be understood that the following description of the method 450 is but one manner of a variety of different manners in which an example of the invention may be practiced. It should also be apparent to those of ordinary skill in the art that the method 450 represents a generalized illustration and that other steps may be added or existing steps may be removed, modified or rearranged without departing from a scope of the method 450.

Generally speaking, the method 450 may be performed to substantially minimize costs associated with supplying power to the electronic system 110, as discussed in greater detail herein above. In one regard, because at least one of the power supplies 120a-120n is heterogeneous with respect to at least one other power supply 120a-120n, greater flexibility is afforded in substantially optimizing the power usage levels of the power supplies 120a-120 a due to, for instance, the different power ratings of the power supplies 120a-120n.

The description of the method 450 is made with reference to the power management system 100 illustrated in FIG. 1, and thus makes reference to the elements cited therein. It should, however, be understood that the method 450 is not limited to the elements set forth in the power management system 100. Instead, it should be understood that the method 450 may be practiced by a system having a different configuration than that set forth in the power management system 100.

The method 450 may be initiated at step 455 in response to any of a number of stimuli or conditions. For instance, the method 450 may be initiated with activation of the components in the electronic system 110. In addition, or alternatively, the method 450 may be manually initiated or the power control agent 140 may be programmed to initiate the method 450 at various times, for a set duration of time, substantially continuously, etc.

At step 455, power may be supplied to the electronic system 110 from the one or more heterogeneous power supplies 120a-120n. In addition, the power control agent 140 may implement the power monitor module 144 to monitor which of the one or more heterogeneous power supplies 120a-120n is supplying power to the electronic system 110, at step 460.

At step 465, the power control agent 140 may determine the power consumption level of the electronic system 110. More particularly, for instance, the power control agent 140 may receive information pertaining to the current or predicted power consumption level of the electronic system 110 from the power usage detector 114.

The power control agent 140 may compare the current or predicted power consumption level of the electronic system 110 with the efficiency curves of the heterogeneous power supplies 120a-120n, at step 470. Based upon the comparison, the power control agent 140 may determine which of the one or more heterogeneous power supplies 120a-120n are to be used in supplying power to the electronic system 110 to substantially optimize power usage levels of the one or more heterogeneous power supplies 120a-120n. By way of example, if the electronic system 110 is operating at 50% of maximum load capacity and the efficiency curves for two power supplies 120a and 120b indicate a combined efficiency rating of 60% and the efficiency curves for three power supplies 120c-120e indicate a combined efficiency rating of 90%, the power control agent 140 may determine that the use of the three power supplies 120c-120e substantially optimizes the amount of power lost in using the power supplies 120a-120n to supply power to the electronic system 110.

At step 480, the power control agent 140 may implement the substantially optimized power supply 120a-120n usage determined at step 475. In addition, the method 450 may be repeated in a generally continuous manner to thereby substantially optimize the power usage levels of the one or more power supplies 120a-120n as the power consumption level of the electronic system 110 varies.

The operations set forth in the methods 200, 300, 400, and 450 may be contained as a utility, program, or subprogram, in any desired computer accessible medium. In addition, the methods 200, 300, 400, and 450 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
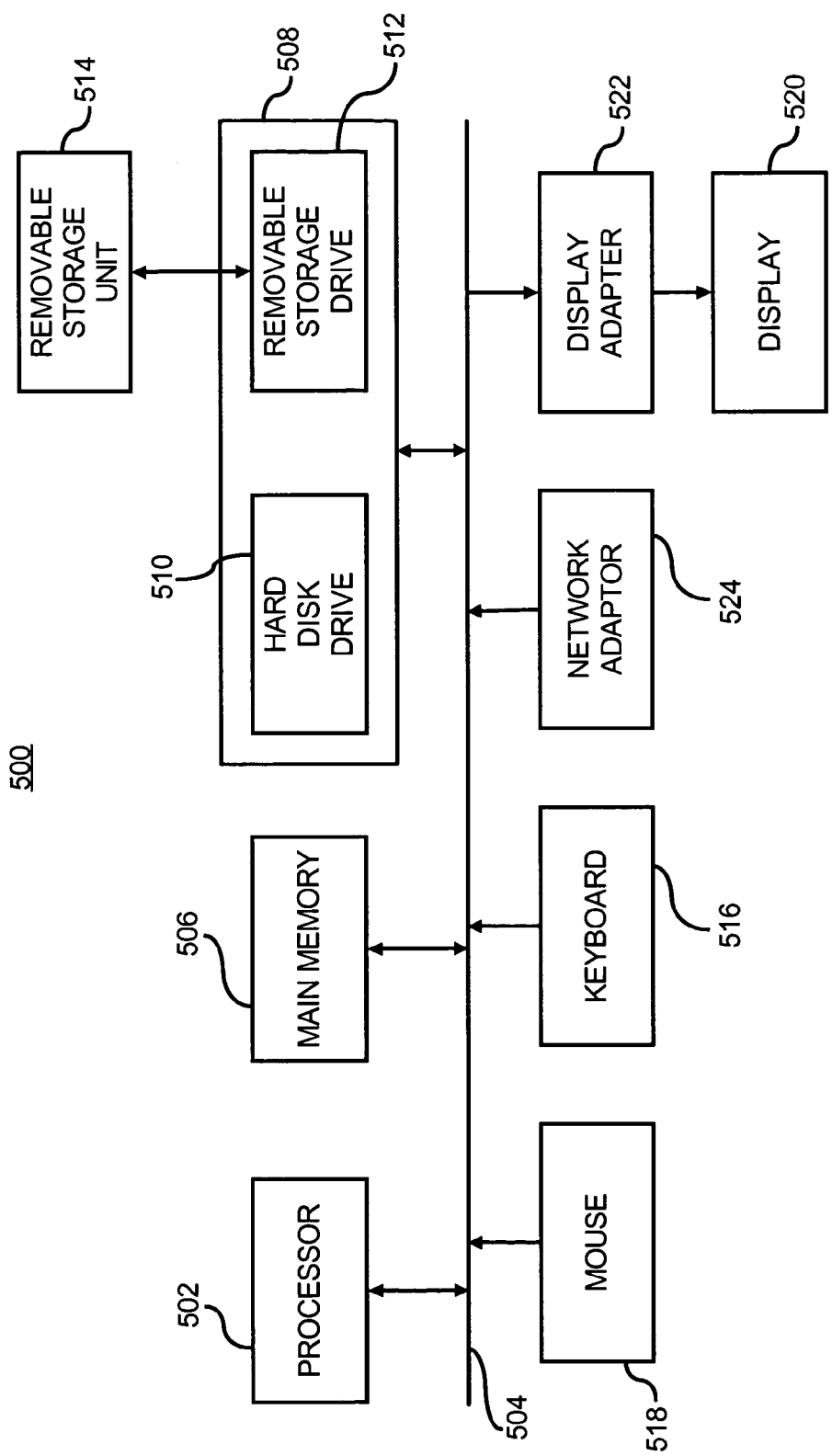
FIG. 5 illustrates a computer system, which may be employed to perform various functions described herein, according to an embodiment of the invention.

FIG. 5 illustrates a computer system 500, which may be employed to perform the various functions of the power control gent 140 described herein above, according to an example. In this respect, the computer system 500 may be used as a platform for executing one or more of the functions described hereinabove with respect to the power control agent 140.

The computer system 500 includes one or more controllers, such as a processor 502. The processor 502 may be used to execute some or all of the steps described in the methods 200, 300, 400, and 450. Commands and data from the processor 502 are communicated over a communication bus 504. The computer system 500 also includes a main memory 506, such as a random access memory (RAM), where the program code for, for instance, the power control agent 140, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the management of power may be stored.

The removable storage drive 510 reads from and/or writes to a removable storage unit 514 in a well-known manner. User input and output devices may include a keyboard 516, a mouse 518, and a display 520. A display adapter 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A system for managing heterogeneous supply of power, said system comprising:
    a plurality of heterogeneous power supplies, wherein the heterogeneous power supplies comprise a primary power supply and a secondary power supply, the primary power supply having a first power rating and the secondary power supply having a second power rating, wherein the first power rating differs from the second power rating; and
    a power controls agent configured to monitor supply of power to an electronic system, to compare the monitored supply of power to the electronic system to efficiency curves of the primary power supply and the secondary power supply, and to supply power to the electronic system from one or both of the primary power supply and the secondary power supply based upon a determination of which of the one or both of the primary power supply and the secondary power supply has a substantially optimized efficiency curve in comparison with the monitored supply of power to the electronic system.

2. The system according to claim 1, wherein the primary power supply is provisioned to supply sufficient power to handle peak power draws of the electronic system and wherein the secondary power supply is provisioned to supply sufficient power to handle substantially less than peak power draws of the electronic system.

3. The system according to claim 1, wherein the primary power supply and the secondary power supply are provisioned to handle substantially less than peak power draws of the electronic system.

4. The system according to claim 1,
    wherein the power control agent is further configured to modify a power budget for the electronic system according to which of the one or both of the primary power supply and the secondary power supply is supplying power to the electronic system.

5. The system according to claim 4, wherein the electronic system comprises a plurality of power components, wherein the power control agent is configured to select at least one of the plurality of power components to at least one of adjust and throttle to maintain a power consumption level of the electronic system within the modified power budget, and wherein the power control agent is further configured to select at least one of an adjusting and a throttling level for the selected at least one of the plurality of power components.

6. The system according to claim 4, wherein the power control agent is further configured to monitor at least one of a current and a predicted power usage of the electronic system.

7. The system according to claim 6, wherein the power control agent is further configured to compare the monitored at least one of a current and a predicted power usage of the electronic system with a predetermined power consumption level, wherein the predetermined power consumption level comprises a power rating corresponding to the secondary power supply.

8. The system according to claim 7, wherein the power control agent is further configured to vary power delivery to the electronic system from at least one of the primary power supply and the secondary power supply to a different at least one of a primary power supply and a secondary power supply in response to the monitored at least one of a current and a predicted power usage falling below the predetermined power consumption level.

9. The system according to claim 7, wherein the power control agent is further configured to compare the at least one of the current and predicted power usage of the electronic system to a plurality of efficiency curves for one or more of the plurality of heterogeneous power supplies, and wherein the power control agent is further configured to determine which of the one or more of the plurality of heterogeneous power supplies are to supply power to the electronic system based upon a determination of the one or more heterogeneous power supplies having a substantially optimized efficiency curve in comparison to the at least one of the current and predicated power usage.

10. A method for supplying power to an electronic system with heterogeneous power supplies, said method comprising:
    monitoring the supply of power to the electronic system from one or more of the heterogeneous power supplies, wherein the one or more heterogeneous power supplies comprises a primary power supply and a secondary power supply, and wherein the primary power supply has a different power rating as compared to the secondary power supply;
    comparing the monitored supply of power to the electronic system to efficiency curves of the primary power supply and the secondary power supply; and
    supplying power to the electronic system from one or both of the primary power supply and the secondary power supply based upon a determination of which of the one or more both of the primary power supply and the secondary power supply has a substantially optimized efficiency curve in comparison with the monitored supply of power to the electronic system.

11. The method according to claim 10, further comprising:
    identifying a maximum power rating of the one or more heterogeneous power supplies determined to be supplying power to the electronic system.

12. The method according to claim 11, said method further comprising adjusting the power budget of the electronic system to correspond to the maximum identified power rating of the one or more heterogeneous power supplies.

13. The method according to claim 12, wherein the electronic system comprises a plurality of power components, said method further comprising:
    selecting at least one of the plurality of power components to at least one of throttle and adjust in maintaining a power consumption level of the electronic system within the adjusted power budget;
    selecting at least one level to at least one of adjust and throttle the selected at least one of the plurality of power components to maintain the power consumption level of the electronic system within the adjusted power budget; and
    modifying at least one operation of the selected at least one of the plurality of power components to maintain a power consumption level of the electronic system within the adjusted power budget.

14. The method according to claim 13, wherein the selected at least one of the plurality of power components comprises a processor having at least two power states, and wherein modifying at least one operation further comprises increasing a power state of the processor to thereby reduce a power consumption level of the processor.

15. The method according to claim 12, wherein adjusting a power budget of the electronic system further comprises adjusting the power budget in response to a detected failure in the primary power supply.

16. A system for supplying power to an electronic system with heterogeneous power supplies, said heterogeneous power supplies comprising a primary power supply having a first power rating and a secondary power supply having a second power rating, wherein the first power rating differs from the second power rating, said system comprising:
- means for monitoring the supply of power from one or more of the heterogeneous power supplies to the electronic system;
- means for comparing the monitored supply of power to the electronic system to efficiency curves of the primary power supply and the secondary power supply; and
- means for supplying power to the electronic system from one or both of the primary power supply and the secondary power supply based upon a determination of which of the one or both of the primary power supply and the secondary power supply has a substantially optimized efficiency curve in comparison with the monitored supply of power to the electronic system.

17. A computer program product embodied on a computer-readable storage device and comprising code that, when executed, causes a computer to perform the following:
- monitor a supply of power to an electronic system from one or more of a plurality of heterogeneous power supplies, wherein the plurality of heterogeneous power supplies comprises a primary power supply and a secondary power supply, and wherein the primary power supply has a higher power rating as compared to the secondary power supply;
- compare the monitored supply of power to the electronic system to efficiency curves of the primary power supply and the secondary power supply; and
- supply power to the electronic system from one or both of the primary power supply and the secondary power supply based upon a determination of which of the one or more both of the primary power supply and the secondary power supply has a substantially optimized efficiency curve in comparison with the monitored supply of power to the electronic system.

* * * * *

UNITED STATES PATENT AND TRADEMARK OFFICE
CERTIFICATE OF CORRECTION

PATENT NO. : 7,529,949 B1  
APPLICATION NO. : 11/258758  
DATED : May 5, 2009  
INVENTOR(S) : Parthasarathy Ranganathan et al.

Page 1 of 1

It is certified that error appears in the above-identified patent and that said Letters Patent is hereby corrected as shown below:

In column 3, line 7, delete "100" and insert -- 110 --, therefor.

In column 3, line 55, delete "1200a" and insert -- 120a --, therefor.

In column 4, line 3, delete "present" and insert -- preset --, therefor.

In column 7, line 19, delete "a step" and insert -- at step --, therefor.

In column 12, line 33, delete "gent" and insert -- agent --, therefor.

In column 12, line 62, delete "adapator" and insert -- adaptor --, therefor.

In column 13, line 24, in Claim 1, delete "controls" and insert -- control --, therefor.

In column 14, line 23, in Claim 9, delete "predicated" and insert -- predicted --, therefor.

Signed and Sealed this

Seventeenth Day of November, 2009

David J. Kappos  
*Director of the United States Patent and Trademark Office*